United States Patent
Tagawa et al.

(10) Patent No.: US 9,002,561 B2
(45) Date of Patent: Apr. 7, 2015

(54) DRIVE CONTROL APPARATUS AND DRIVE CONTROL METHOD FOR HYBRID VEHICLES AND HYBRID VEHICLE

(75) Inventors: Masaaki Tagawa, Shizuoka (JP); Yoshiki Ito, Shizuoka (JP); Masakazu Saito, Shizuoka (JP); Hitoshi Ohkuma, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/981,033

(22) PCT Filed: Jan. 31, 2011

(86) PCT No.: PCT/JP2011/000534
§ 371 (c)(1),
(2), (4) Date: Jul. 22, 2013

(87) PCT Pub. No.: WO2012/104905
PCT Pub. Date: Aug. 9, 2012

(65) Prior Publication Data
US 2013/0304295 A1 Nov. 14, 2013

(51) Int. Cl.
*B60W 20/00* (2006.01)
*B60K 6/445* (2007.10)
(Continued)

(52) U.S. Cl.
CPC ............. *B60W 20/106* (2013.01); *B60K 6/445* (2013.01); *B60W 10/06* (2013.01); *B60W 10/26* (2013.01); *B60W 20/00* (2013.01); *B60W 10/08* (2013.01); *B60K 2006/381* (2013.01); *B60W 2510/244* (2013.01); *B60Y 2300/92* (2013.01);
(Continued)

(58) Field of Classification Search
CPC ...................................................... B60W 20/00
See application file for complete search history.

(56) References Cited

U.S. PATENT DOCUMENTS 6,422,972 B1 * 7/2002 Eguchi ........................... 477/107
6,886,648 B1 * 5/2005 Hata et al. ................. 180/65.235
(Continued)

FOREIGN PATENT DOCUMENTS

JP 59-204402 A 11/1984
JP 2007-283815 A 11/2007
(Continued)

OTHER PUBLICATIONS

International Search Report mailed Apr. 5, 2011 in PCT/JP2011/000534.

*Primary Examiner* — Jonathan M Dager
(74) *Attorney, Agent, or Firm* — Rothwell, Figg, Ernst & Manbeck, P.C.

(57) ABSTRACT

A hybrid vehicle, a drive control apparatus, and a drive control method to prevent overcharging a battery, and providing an output drive force depending on a driver's request. The drive control apparatus for hybrid vehicles outputs generated power at an internal combustion engine and a motor generator through a power transmission mechanism to drive axles, and includes an output shaft fixing mechanism which fixes an internal combustion engine output shaft to disable rotation. A request drive force setter sets a request drive force depending on a driver's request. A controller executes a control based on a detected battery stored energy level to operate irrespective of a magnitude of the request drive force to stop the internal combustion engine, uses the shaft fixing mechanism to fix the output shaft, and provides travel using generated power from the motor generator.

12 Claims, 7 Drawing Sheets

(51) Int. Cl.
  *B60W 10/06* (2006.01)
  *B60W 10/26* (2006.01)
  *B60W 10/08* (2006.01)
  *B60K 6/38* (2007.10)
  *F16H 37/10* (2006.01)

(52) U.S. Cl.
  CPC ....... *F16H2037/102* (2013.01); *Y02T 10/6239* (2013.01); *B60W 2600/00* (2013.01); *Y10S 903/93* (2013.01)

(56) References Cited

U.S. PATENT DOCUMENTS

| | | | | |
|---|---|---|---|---|
| 8,649,924 | B2* | 2/2014 | Imaseki | 701/22 |
| 2005/0080523 | A1* | 4/2005 | Bennett et al. | 701/22 |
| 2005/0178594 | A1* | 8/2005 | Yamauchi et al. | 180/65.2 |
| 2005/0184529 | A1* | 8/2005 | Ueda | 290/40 C |
| 2005/0266957 | A1* | 12/2005 | Kamijo et al. | 477/3 |
| 2006/0172843 | A1* | 8/2006 | Nada | 475/2 |
| 2007/0101806 | A1* | 5/2007 | Yamaguchi | 73/117.3 |
| 2007/0151536 | A1* | 7/2007 | Yamauchi et al. | 123/179.4 |
| 2007/0227792 | A1* | 10/2007 | Yonemori et al. | 180/65.3 |
| 2007/0298928 | A1* | 12/2007 | Yamanaka et al. | 477/15 |
| 2008/0093141 | A1* | 4/2008 | Muta et al. | 180/65.4 |
| 2008/0309093 | A1* | 12/2008 | Ando et al. | 290/40 C |
| 2009/0021203 | A1* | 1/2009 | Claeys et al. | 318/452 |
| 2009/0105924 | A1* | 4/2009 | Kamichi et al. | 701/99 |
| 2010/0070122 | A1* | 3/2010 | Niimi | 701/22 |
| 2010/0121510 | A1* | 5/2010 | Watanabe | 701/22 |
| 2010/0145562 | A1* | 6/2010 | Moran | 701/22 |
| 2010/0256849 | A1* | 10/2010 | Akimoto | 701/22 |
| 2011/0000725 | A1* | 1/2011 | Murota et al. | 180/65.245 |
| 2011/0231043 | A1* | 9/2011 | Ebuchi et al. | 701/22 |
| 2012/0065827 | A1* | 3/2012 | Kimura et al. | 701/22 |
| 2012/0065828 | A1* | 3/2012 | Kato | 701/22 |
| 2012/0203414 | A1* | 8/2012 | Akutsu et al. | 701/22 |
| 2013/0307329 | A1* | 11/2013 | Ito et al. | 307/10.1 |
| 2013/0311029 | A1* | 11/2013 | Tagawa et al. | 701/22 |
| 2014/0067180 | A1* | 3/2014 | Tagawa et al. | 701/22 |
| 2014/0081499 | A1* | 3/2014 | Ito et al. | 701/22 |
| 2014/0081500 | A1* | 3/2014 | Ito et al. | 701/22 |
| 2014/0088807 | A1* | 3/2014 | Saito et al. | 701/22 |
| 2014/0180515 | A1* | 6/2014 | Ueda et al. | 701/22 |

FOREIGN PATENT DOCUMENTS

| | | |
|---|---|---|
| JP | 2008-94238 A | 4/2008 |
| JP | 2009-220788 A | 10/2009 |
| JP | 2010-269692 A | 12/2010 |
| WO | 2010/070706 A1 | 6/2010 |

* cited by examiner

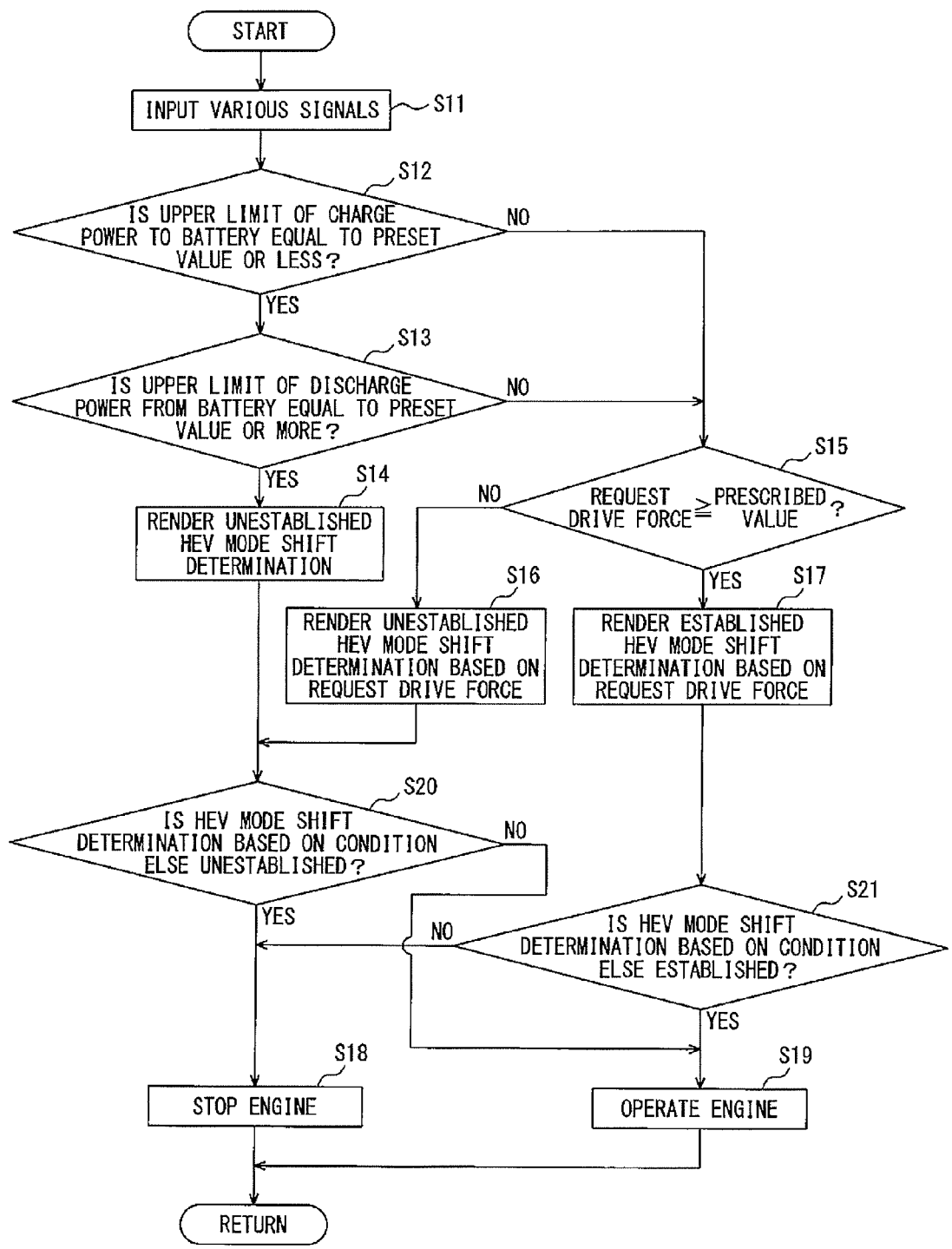

US 9,002,561 B2

DRIVE CONTROL APPARATUS AND DRIVE CONTROL METHOD FOR HYBRID VEHICLES AND HYBRID VEHICLE

CROSS REFERENCE TO RELATED APPLICATION

This application is a 35 U.S.C. 371 National Phase Entry Application from PCT/JP2011/000534, filed Jan. 31, 2011, the disclosure of which is incorporated herein in its entirety by reference.

TECHNICAL FIELD

The present invention relates to a drive control apparatus and a drive control method for hybrid vehicles including an engine and a motor generator as power sources, and a hybrid vehicle, and particularly, to technologies for controlling power sources to output targeted drive power, avoiding overcharging a battery.

BACKGROUND ART

Hybrid vehicles are adapted for using both an engine and a motor generator being running power sources to drive wheels. Hybrid vehicles are equipped with a battery that has a large capacity for services including electric power supply and charge to the motor generator. The battery is charged by the motor generator that generates electricity when operated for regeneration or when driven by the engine, so electric power is available from the battery for operating the motor generator to drive the drive wheels. The battery deteriorates under overcharge conditions. It therefore is desirable to suppress the deterioration, with an extended service life.

There have been proposals made for hybrid vehicles (for instance, refer to the PTL1 below), including operations of an engine in order to employ, not only torque of a motor generator, but also torque of the engine for a drive of vehicle in a travel needing a large drive force at a low-vehicle speed, such as when starting a hill-climbing movement.

CITATION LIST

Patent Literature

PTL 1: JP 2009-220788 A

SUMMARY OF INVENTION

Technical Problem

However, in such hybrid vehicles, torque of an engine was divided, inclusive of a division used as charge torque at a motor generator, with anxieties about a battery having a state of charge near the upper limit value, with a tendency to get overcharged, causing a deterioration of the battery. Therefore, to avoid overcharging the battery, separate countermeasures were required.

The present invention has been devised in view of the foregoing problem. It is an object of the present invention to provide a hybrid vehicle, a drive control apparatus, and a drive control method adapted to prevent overcharging a battery, affording to output a drive force as requested by the driver.

Solution to Problem

According to a first aspect of the present invention, there is provided a drive control apparatus for hybrid vehicles adapted to output generated power at an internal combustion engine and a motor generator through a power transmission mechanism to drive axles. The drive control apparatus for hybrid vehicles includes an output shaft fixing mechanism, a request drive force setter, a stored energy level detector, and a controller. The output shaft fixing mechanism is operable to fix an end of an output shaft of the internal combustion engine as necessary to disable rotation of the output shaft. The request drive force setter is made up to set up a request drive force depending on a driver's request. The stored energy level detector is made up to detect a stored energy level of a battery. The controller is made up for a control to be executed in accordance with a condition based on the stored energy level to operate irrespective of a magnitude of the request drive force to stop the internal combustion engine, use the output shaft fixing mechanism to fix the output shaft, and make a travel simply using generated power from the motor generator.

According to the first aspect, in the drive control apparatus, the above-noted condition may include the stored energy level being a preset value or more, for a control to suppress overcharging the battery.

According to the first aspect, the above-noted condition may include a combination of an upper limit of charge power to the battery and an upper limit of discharge power from the battery set up on a basis of the stored energy level, the upper limit of charge power to the battery being a preset value or less, the upper limit of discharge power from the battery being a preset value or more.

According to the first aspect, the controller may well be adapted in a situation free from the control being executed in accordance with the above-noted condition to stop the internal combustion engine, for a control to drive the internal combustion engine and the motor generator, when the request drive force is a prescribed value or more, and for a control to stop the internal combustion engine, use the output shaft fixing mechanism to fix the output shaft, and make a travel simply using generated power from the motor generator, when the request drive force is smaller than the prescribed value.

According to the first aspect, the motor generator may include a pair of a first motor generator and a second motor generator, and the power transmission mechanism may include a planetary gear set having four elements being the internal combustion engine, the first motor generator, the second motor generator, and an output section connected on a collinear diagram in an order of the first motor generator, the internal combustion engine, the output section, and the second motor generator.

According to the first aspect, the output shaft fixing mechanism may include a one-way clutch connected to the output shaft of the internal combustion engine, to permit rotation thereof in one direction and disable rotation thereof in the reverse direction.

According to the first aspect, the output shaft fixing mechanism may be operable to fix a member directly connected to the output shaft of the internal combustion engine, to disable rotation thereof.

According to a second aspect of the present invention, there is provided a drive control method for hybrid vehicles adapted to output generated power at an internal combustion engine and a motor generator through a power transmission mechanism to drive axles. The drive control method for hybrid vehicles includes executing a control in accordance with a condition based on a stored energy level of a battery to operate irrespective of a magnitude of a request drive force depending on a driver's request to stop the internal combustion engine, fix an output shaft of the internal combustion engine to disable rotation thereof, and make a travel simply using generated power from the motor generator.

According to the second aspect, in the drive control method, the above-noted condition may include the stored energy level being a preset value or more, for a control to suppress overcharging the battery.

According to the second aspect, the above-noted condition may include a combination of an upper limit of charge power to the battery and an upper limit of discharge power from the battery set up on a basis of the stored energy level of the battery, the upper limit of charge power to the battery being a preset value or less, the upper limit of discharge power from the battery being a preset value or more.

According to the second aspect, there may be an adaptation implemented in a situation free from the control being executed in accordance with the above-noted condition to stop the internal combustion engine, for a control to drive the internal combustion engine and the motor generator, when the request drive force is a prescribed value or more, and for a control to stop the internal combustion engine, fix the output shaft to disable rotation thereof, and make a travel simply using generated power from the motor generator, when the request drive force is smaller than the prescribed value.

According to a third aspect of the present invention, there is provided a hybrid vehicle including a drive control apparatus according to the first aspect.

Advantageous Effects of Invention

According to the present invention, there can be achieved a hybrid vehicle, a drive control apparatus, and a drive control method adapted to fix an output shaft of an internal combustion engine, permitting a motor generator to rotate without entering any electricity generating state. This prevents overcharging a battery, affording to output a drive force as requested by the driver.

BRIEF DESCRIPTION OF DRAWINGS

FIG. 7 is a flowchart showing a modification of the drive control method according to the second embodiment of the present invention.

EMBODIMENTS OF INVENTION

According to embodiments of the present invention, there are hybrid vehicles and drive control apparatuses characterized by a one-way cutch as an output shaft fixing mechanism for fixing an output shaft of an engine being an internal combustion engine, a request drive force setter for setting up a request drive force depending on a driver's request, a stored energy level detector for detecting a stored energy level of a battery, and a controller.

The controller is adapted for a control to be executed when the stored energy level detector has detected a stored energy level of the battery equal to or larger than a preset value, to operate irrespective of the magnitude of a request drive force set up by the request drive force setter, to stop the engine, and operate the output shaft fixing mechanism, using the output shaft fixing mechanism to fix the output shaft of the engine, to make a travel simply using generated power from paired motor generators.

First Embodiment

Figure 1:
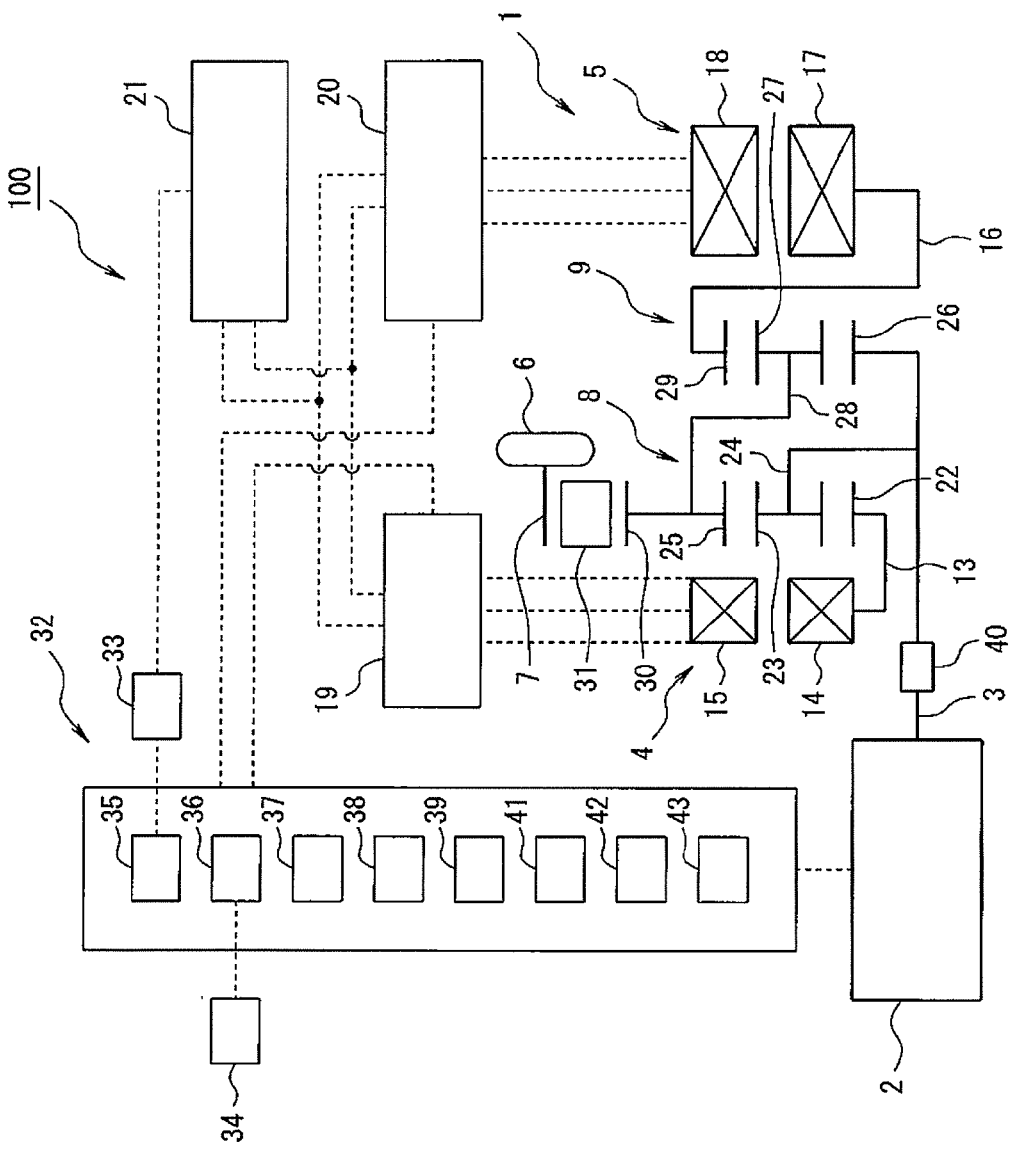
FIG. 1 is a system configuration diagram of a hybrid vehicle including a drive control apparatus according to a first embodiment of the present invention.

There will be described a first embodiment of the present invention, with reference to the drawings. This embodiment covers a drive control method, a drive control apparatus 32, and a hybrid vehicle 100 on which the drive control apparatus 32 is mounted. As shown in FIG. 1, the hybrid vehicle 100 includes a drive train 1 and the drive control apparatus 32.

[Configuration of the Drive Train]

Description is now made of the drive train 1. As shown in FIG. 1, the drive train 1 includes an output shaft 3 of an engine 2, a combination of a first motor 4 (sometimes referred to as MG1) and a second motor 5 (sometimes referred to as MG2), drive axles 7, and a combination of a first planetary gear set 8 and a second planetary gear set 9. The first motor 4 and the second motor 5 serve as a first motor generator and a second motor generator, respectively, to produce drive forces when powered, and to produce electric energies when driven. The drive axles 7 are connected to drive wheels 6 of the hybrid vehicle 100. The first planetary gear set 8 and the second planetary gear set 9 are respectively interconnected among the output shaft 3, first motor 4, second motor 5, and drive axles 7. Here, the combination of the first planetary gear set 8 and the second planetary gear set 9 constitutes a power transmission mechanism. As illustrated in FIG. 1, the output shaft 3 is connected through a one-way clutch 40 to the first planetary gear set 8, and to the second planetary gear set 9.

The first motor 4 has a first motor stator 15, a first motor rotor 14, and a first motor rotor shaft 13. The second motor 5 has a second motor stator 18, a second motor rotor 17, and a second motor rotor shaft 16.

At the first motor 4, the first motor stator 15 is connected to a first inverter 19. At the second motor 5, the second motor stator 18 is connected to a second inverter 20. The first motor 4 and the second motor 5 are operable when supplied with electric power from a (high-voltage) battery 21 being an electricity storage device, to produce drive forces, and when driven for regeneration, to produce electric energies to charge the battery 21. For the first motor 4 and the second motor 5, the electric power supply is controlled by the first inverter 19 and the second inverter 20, respectively.

The first planetary gear set 8 includes a first sun gear 22, a first ring gear 25, and a first planetary carrier 24 supporting first planetary gears 23. The first planetary gears 23 mesh with the first sun gear 22. The first planetary gears 23 are meshed with the first ring gear 25. The second planetary gear set 9 includes a second sun gear 26, a second ring gear 29, and a second planetary carrier 28 supporting second planetary gears 27. The second planetary gears 27 mesh with the second sun gear 26. The second planetary gears 27 are meshed with the second ring gear 29.

For the first planetary gear set 8 and the second planetary gear set 9, rotational centerlines of rotary elements are coaxially arranged. The first motor 4 is disposed in position between the first planetary gear set 8 and the engine 2. The second motor 5 is disposed in position on the far side of the second planetary gear set 9 relative to the engine 2.

At the first planetary gear set 8, the first sun gear 22 is connected to the first motor rotor shaft 13 of the first motor 4. The first planetary carrier 24 of the first planetary gear set 8 and the second sun gear 26 of the second planetary gear set 9 are coupled with each other, and connected through the one-way clutch 40 to the output shaft 3 of the engine 2. The first ring gear 25 of the first planetary gear set 8 and the second planetary carrier 28 of the second planetary gear set 9 are coupled with each other, and connected to an output section 30. The output section 30 is connected to the drive axles 7, through an output transmission 31 using chains, gears, or such. At the second planetary gear set 9, the second ring gear 29 is connected to the second motor rotor shaft 16 of the second motor 5. In such a configuration of the drive train 1, drive forces are transferred among the engine 2, the first motor 4, the second motor 5, and the drive axles 7.

[Configuration of the Drive Control Apparatus]

As shown in FIG. 1, the drive control apparatus 32 is connected to a stored energy level detector 33, and an accelerator opening detector 34. The stored energy level detector 33 detects a state of charge SOC of the battery 21. The accelerator opening detector 34 detects an accelerator opening tvo that is the depression amount of an accelerator pedal.

The drive control apparatus 32 includes a stored energy level determiner 35, a request drive force setter 36, a request drive force determiner 37, a vehicle speed detector 38, a target charge-discharge power setter 39, a target drive power setter 41, a target engine power setter 42, and a target engine operating point calculator 43.

Figure 2:
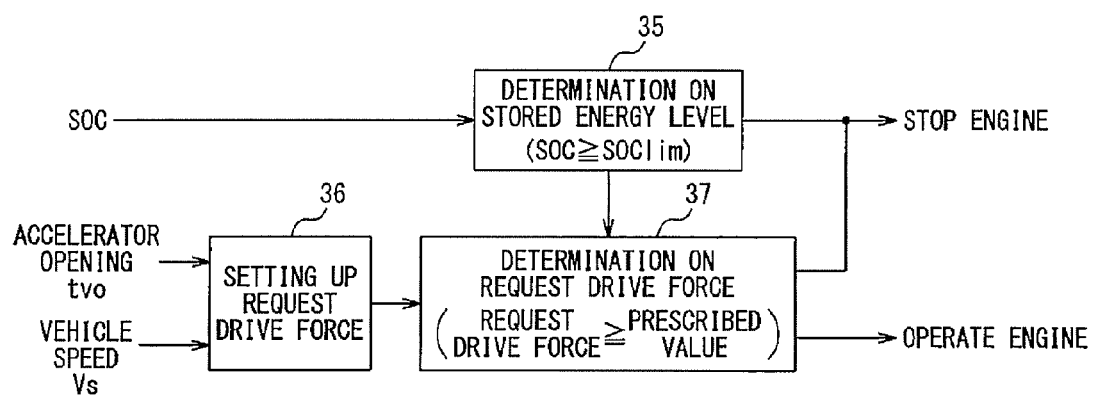
FIG. 2 is a control bock diagram of the drive control apparatus according to the first embodiment of the present invention.

FIG. 2 is a control block diagram showing functions of the stored energy level detector 33, the stored energy level determiner 35, the request drive force setter 36, and the request drive force determiner 37.

The stored energy level determiner 35 determines whether or not the state of charge (as a charged energy level) SOC is equal to or larger than a prescribed value (SOClim) that is a value set up in advance. If it is equal to or larger than the prescribed value (SOClim), there is output a command of HEV mode unestablishment for making no shift to an HEV mode. It is noted that the prescribed value (SOClim) set up is lower than an adequate upper limit of stored energy level at the battery. The value set up is given as much allowance as to keep the upper limit from being promptly reached when electricity generation has occurred at the first motor 4 or the like.

The request drive force setter 36 is operable on an unshown request drive force retrieval map, for instance, for a retrieval to set up a request drive force based on an opening tvo of an accelerator. The request drive force determiner 37 determines whether or not the request drive force needed is a drive force equal to or larger than a prescribed value, such as that in a situation needing a large drive force, like that such as when starting a movement to climb a hill with a high inclination, for instance.

The request drive force setter 36 is adapted to operate on a request drive force retrieval map, to retrieve a request drive force Fdrv, to set up for use to drive the hybrid vehicle 100, in accordance with a combination of an accelerator opening tvo detected by the accelerator opening detector 34 and a vehicle speed Vs detected by the vehicle speed detector 38.

The vehicle speed detector 38 is adapted to detect a vehicle speed (as a vehicular speed) Vs of the hybrid vehicle 100. The target charge-discharge power setter 39 is adapted to set up a target charge-discharge power Pbat based at least on a state of charge SOC of the battery 21 detected by the stored energy level detector 33. In this embodiment, it is operable on an unshown target charge-discharge power retrieval map, for instance, for a retrieval to set up a target charge-discharge power Pbat based on a state of charge SOC of the battery 21, for instance.

The target drive power setter 41 is adapted to set up a target drive power Pdrv based on a combination of an accelerator opening tvo detected by the accelerator opening detector 34 and a vehicle speed Vs detected by the vehicle speed detector 38. In this embodiment, it is operable to multiply the request drive force Fdrv by the vehicle speed Vs to set up the target drive power Pdrv.

The target engine power setter 42 is adapted to calculate a value of target engine power Peg from a combination of a target drive power Pdrv set up by the target drive power setter 41 and a target charge-discharge power Pbat calculated by the target charge-discharge power setter 39. In this embodiment, the target charge-discharge power Pbat is subtracted from the target drive power Pdrv to obtain the target engine power Peg.

The target engine operating point calculator 43 is operable on an unshown target engine operating point retrieval map, for instance, for a retrieval to set up a target engine operating point (target engine rotation speed, target engine torque) in accordance with the target engine power Peg and vehicle speed.

[Drive Control Method]

Figure 3:
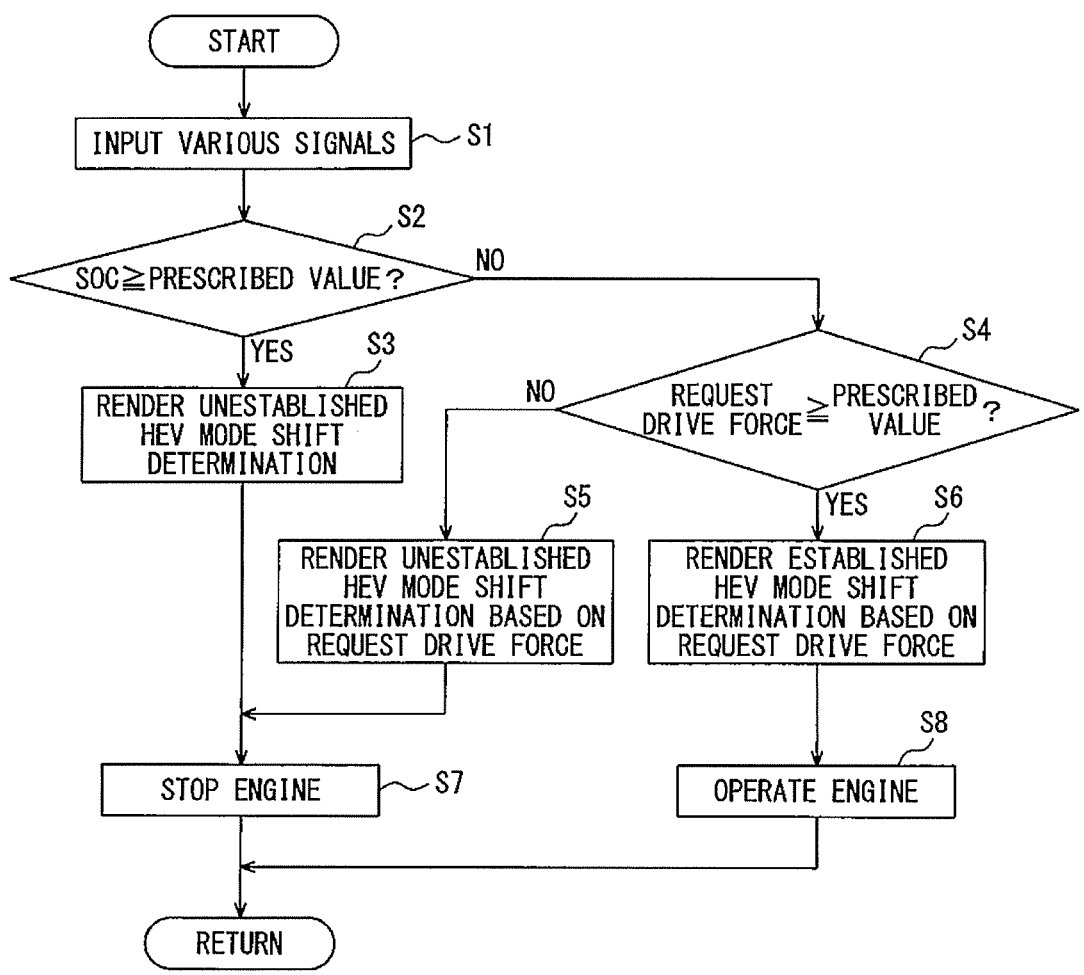
FIG. 3 is a flowchart of a drive control method according to the first embodiment of the present invention.

FIG. 3 is a flowchart showing a performance of control at the drive control apparatus 32 in the hybrid vehicle 100. This routine is repeated to execute at intervals of a prescribed time.

As shown in FIG. 3, first (at a step S1), various signals are input, including a stored energy level (as an SOC) from the stored energy level detector 33, and a value of request drive force calculated on the basis of an accelerator opening from the accelerator opening detector 34.

Next (at a step S2), at the stored energy level determiner 35, it is determined whether or not the SOC is equal to or larger than a prescribed value (SOClim) that is lower than an upper limit value of charge to the battery 21. At the step S2, if (YES i.e. if) the SOC is equal to or larger than the prescribed value (SOClim), then (at a step S3) there is output a command to undo a shift to an HEV mode (as the mode of using the engine 2 and the motor generator in a hybrid manner), that is, to render the HEV mode unestablished (i.e., render an EV mode established).

In such a situation, given the command for unestablishment of HEV mode, the drive control apparatus 32 operates (at a step S7) to stop the engine 2, while using the one-way clutch 40 to fix, not to rotate, the output shaft 3 of the engine 2.

At the step S2, if (NO i.e. if) the SOC is smaller than the prescribed value (SOClim), then (at a step S4) the request drive force determiner 37 operates to determine whether or not the request drive force is a drive force equal to or larger than a prescribed value (i.e. request drive force≥prescribed value), such as that to be set in a situation needing a large drive force, like that such as when starting a movement to climb a hill with a high inclination, for instance.

At the step S4, if (NO i.e. if) the request drive force is smaller than the prescribed value, then (at a step S5) there is a conclusion drawn to (render the EV mode established, i.e.,) render unestablished an HEV mode shift determination based on the request drive force. Thus, given a command for unestablishment of HEV mode, the drive control apparatus 32 operates to stop the engine 2 (at the step S7), while using the one-way clutch 40 to fix, not to rotate, the output shaft 3 of the engine 2.

At the step S4, if (YES i.e. if) the request drive force is equal to or larger than the prescribed value, then (at a step S6) there is a conclusion drawn to render established an HEV mode shift determination based on the request drive force. This determination to establish a shift to the HEV mode is followed by actions (at a step S8) to operate the engine 2, and execute a control for a travel in the HEV mode, before going to a return. It is noted that in the course passing the step S8, the output shaft 3 of the engine 2 is kept free from restrictions to the rotation due to use of the one-way clutch 40.

In the first embodiment described, when the engine 2 is stopped, the output shaft 3 of the engine 2 is fixed by the one-way clutch 40 disabling the rotation, affording for both the first motor 4 and the second motor 5 to rotate without generating electricity, thus avoiding overcharging the battery 21. Moreover, according to this embodiment, the hybrid vehicle 100 is allowed to output a drive force requested by the driver, suppressing overcharge to the battery 21.

Figure 4:
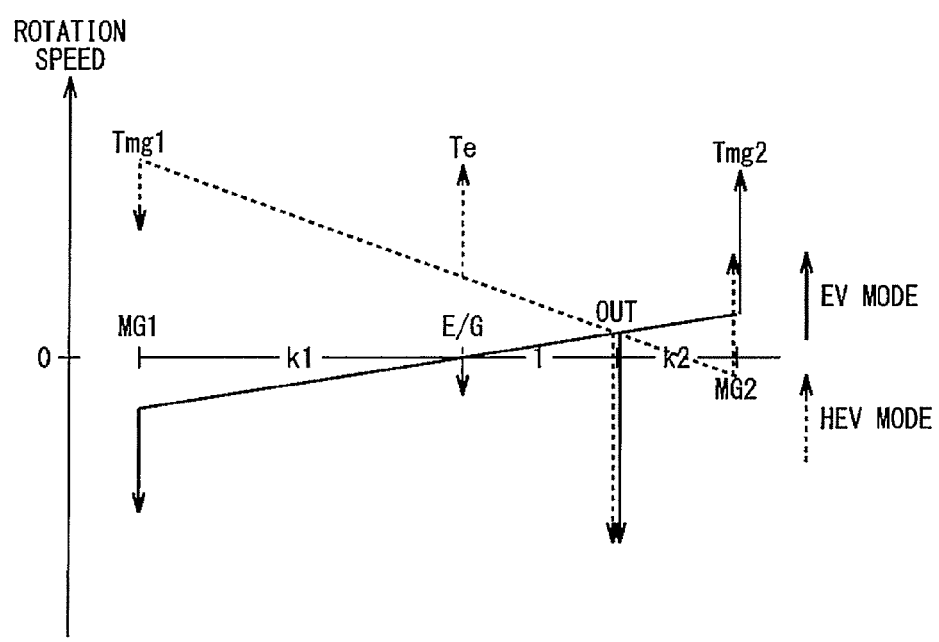
FIG. 4 is a collinear diagram showing relationships between rotation speeds and torque values in an HEV mode and an EV mode of a hybrid vehicle in compliance with the drive control method according to the first embodiment of the present invention.

FIG. 4 is a collinear diagram showing operating points the system has when running with high drive forces at low vehicle speeds in the HEV mode and the EV mode, respectively. As will be seen from FIG. 4, in a conventional HEV mode, the first motor 4 and the second motor 5 might have got regenerative, overcharging the (high-voltage) battery 21, as an anxiety. According to this embodiment, the drive control apparatus 32 implements a control, whereby such the state of running is involved as a running in the EV mode, in which the engine 2 has a rotation speed of 0, and the first motor 4 and the second motor 5 enter their driving states without generating electricity, thus avoiding overcharge.

Further, according to this embodiment, in the EV mode, the one-way clutch 40 is used to receive torque of the first motor 4 and the second motor 5, acting counter, so that as shown in FIG. 4 the output section (OUT) 30 has torque of the first motor 4 and the second motor 5 acting thereon, thus allowing the EV mode also to have equivalent torque to the HEV mode acting on the output section 30.

Modification of the First Embodiment

Figure 5:
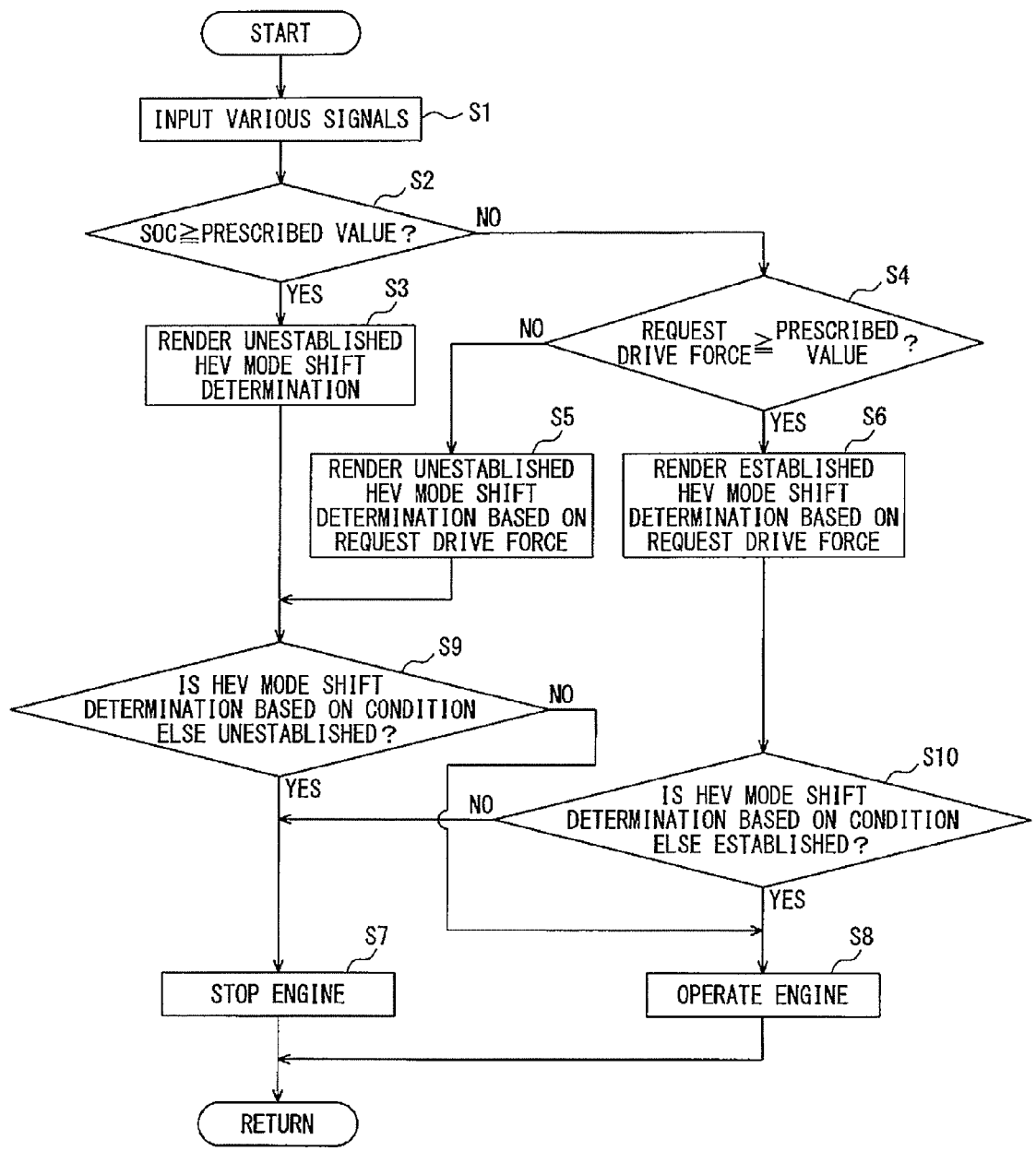
FIG. 5 is a flowchart showing a modification of the drive control method according to the first embodiment of the present invention.

FIG. 5 is a flowchart showing a modification of the drive control method for the hybrid vehicle 100 according to the first embodiment.

This modification is different from the first embodiment simply in that, in the flowchart shown in FIG. 3 according to the first embodiment, the step S6 is followed by an HEV mode shift determination based on a condition else (at a step S10). Here, the condition else may additionally involve a detection value of an inclination angle for the hybrid vehicle 100 or a determination as to whether or not a snow mode is selected, so that even after an HEV mode shift determination established at the step S6, there can be left still another control to select a determination excluding operation of the engine 2.

According to the modification of the first embodiment including such a control as shown in FIG. 5, there can be achieved a more detailed running control with high integrity, avoiding overcharging a battery 21, as an advantageous effect.

Second Embodiment

Figure 6:
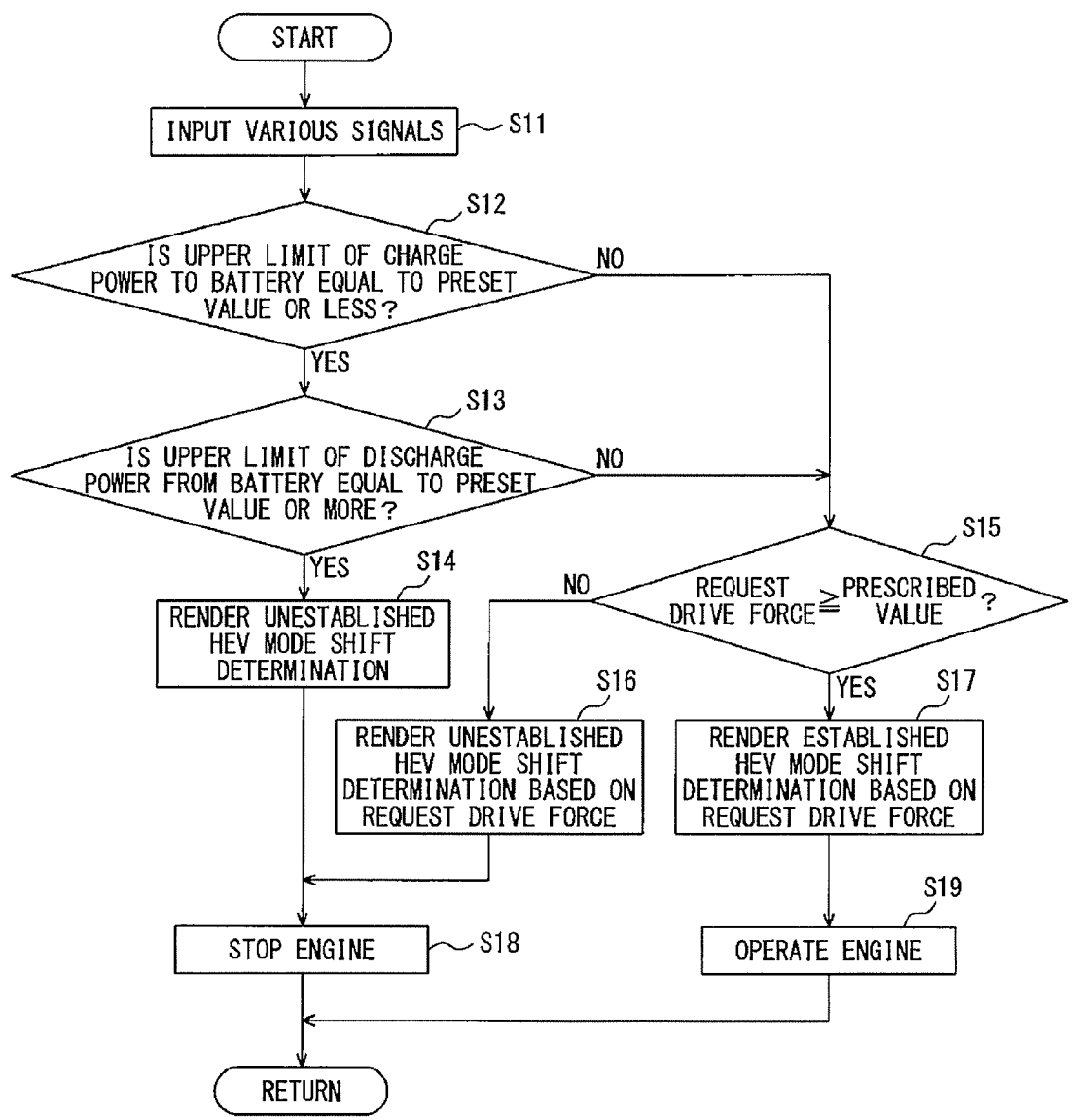
FIG. 6 is a flowchart of a drive control method according to a second embodiment of the present invention.

FIG. 6 is a flowchart showing a drive control method for a hybrid vehicle 100 according to a second embodiment of the present invention. The hybrid vehicle 100 according to this embodiment has its system configuration, which is substantially the same as the hybrid vehicle 100 according to the first embodiment, so redundant description is omitted. It is noted that the routine is repeated to execute at intervals of a prescribed time.

As shown in FIG. 6, at a step S11, various signals are input, including an upper limit value of charge power and an upper limit value of discharge power calculated on the basis of a stored energy level (as an SOC) from a stored energy level detector 33, and a value of request drive force calculated on the basis of an accelerator opening from an accelerator opening detector 34.

Next (at a step S12), it is determined whether the upper limit value of charge power to a battery 21 is equal to or smaller than a preset value. At the step S12, if (YES i.e. if) the upper limit value of charge power is smaller than the prescribed value, then (at a step S13) it is determined whether the upper limit value of discharge power from the battery 21 is equal to or larger than a preset value. It is noted that the upper limit value of charge power as well as the upper limit value of discharge power is set up at a target charge-discharge power setter 39 in a drive control apparatus 32 shown in FIG. 1.

At the step S13, if (YES i.e. if) the upper limit value of discharge power is equal to or larger than the preset value, then (at a step S14) there is a conclusion drawn to render an HEV mode shift determination unestablished, followed by an operation (at a step S18) to stop an engine 2. At this timing, an output shaft 3 of the engine 2 is fixed by a one-way clutch 40 disabling the rotation.

At the step S12 if (NO i.e. if) the upper limit value of charge power is larger than the prescribed value, or at the step S13 if (NO i.e. if) the upper limit value of discharge power is smaller than the prescribed value, then the flow goes to a step S15. At the step S15, it is determined whether or not the request drive force is equal to or larger than a prescribed value, like the flow of control in the first embodiment.

At the step S15, if (NO i.e. if) the request drive force is smaller than the prescribed value, then (at a step S16) there is a conclusion drawn to render unestablished a determination for a shift to an HEV mode based on the request drive force, followed by an operation (at the step S18) to stop the engine 2. At this timing, the output shaft 3 of the engine 2 is fixed by the one-way clutch 40 disabling the rotation.

At the step S15, if (YES i.e. if) the request drive force is equal to or larger than the prescribed value, then (at a step S17) there is a conclusion drawn to render established an HEV mode shift determination based on the request drive force, followed by actions to operate the engine 2, before going to a return.

In the drive control method according to the second embodiment also, when the engine 2 is stopped, the output shaft 3 of the engine 2 is fixed by the one-way clutch 40 disabling the rotation, affording for both a first motor 4 and a second motor 5 to rotate without generating electricity, thus avoiding overcharging the battery 21. Moreover, it is allowed to output a drive force requested by the driver, while suppressing overcharge to the battery 21 as described.

This embodiment involves a running in an EV mode, in which the engine 2 has a rotation speed of 0, and the first motor 4 and the second motor 5 enter their driving states without generating electricity, thus avoiding overcharge. Further, in the EV mode, the one-way clutch 40 is used to receive torque of the first motor 4 and the second motor 5, acting counter, so that an output section (OUT) 30 has torque of the first motor 4 and the second motor 5 acting thereon, allowing for equivalent torque acting on the output section 30, whether in the EV mode or in the HEV mode.

Modification of the Second Embodiment

FIG. 7 is a flowchart showing a modification of the drive control method for the hybrid vehicle 100 according to the second embodiment.

This modification is different from the second embodiment in that, in the flowchart shown in FIG. 6, the step S17 is followed by an HEV mode shift determination based on a condition else (at a step S21). Here, the condition else may additionally involve a detection value of an inclination angle for the hybrid vehicle 100 or a determination as to whether or not a snow mode is selected, so that even after an HEV mode shift determination established at the step S17, there can be left still another control to select a determination excluding operation of the engine 2.

According to the modification of the second embodiment including such a control as shown in FIG. 7, there can be achieved a more detailed running control with high integrity, avoiding overcharging a battery 21, as an advantageous effect.

Other Embodiments

While, for the present invention, embodiments and modifications thereof have been described, discussions as well as drawings constituting part of disclosure of those embodiments should not be construed restrictive to the invention, and the invention covers any and all embodiments that have equivalent effects to what the object of invention covers. Further, the scope of the invention is not limited to combinations of aspects of the invention defined by appended claims, but may well be defined by any and all desirable combinations of specific characteristics among all disclosed characteristics.

For instance, although the hybrid vehicle 100 as well as the drive control apparatus 32 according to the embodiment described includes the one-way clutch 40 employed as an output shaft fixing mechanism for fixing the output shaft 3 of the engine 2, the present invention is not limited thereto, so the scope of the invention covers also such a fixing that employs an output shaft fixing mechanism adapted to fix, as necessary in the power transmission using the planetary gear sets 8 and 9, any member coupled with the output shaft 3 of the engine 2, e.g. one of rotation shafts of, among others, the first planetary carrier 24 and the second sun gear 26.

Although the embodiment described includes, as shown in FIG. 1, a planetary gear set employed as a drive train 1 composed of the first planetary gear set 8 and the second planetary gear set 9 for interconnection among four elements being the output shaft 3 of the engine 2, the first motor 4 (MG1), the second motor 5 (MG2), and the drive axels 7, there may well be any planetary gear set else employed for interconnection among the four elements, within the scope of the invention.

REFERENCE SIGNS LIST 1 drive train
2 engine (as an internal combustion engine)
3 output shaft
4 first motor (as a motor generator)
5 second motor (as a motor generator)
6 wheel
7 drive axle
8 first planetary gear set (as a power transmission mechanism)
9 second planetary gear set (as a power transmission mechanism)
21 battery
30 output section
32 drive control apparatus
33 stored energy level detector
34 accelerator opening detector
35 stored energy level determiner
36 request drive force setter
37 request drive force determiner
38 vehicle speed detector
39 target charge-discharge power setter
40 one-way clutch
41 target drive power setter
42 target engine power setter
43 target engine operating point calculator
100 hybrid vehicle

The invention claimed is:

1. A drive control apparatus for hybrid vehicles adapted to output generated power at an internal combustion engine and a motor generator through a power transmission mechanism to drive axles, the drive control apparatus for hybrid vehicles comprising:
   an output shaft fixing mechanism operable to fix an end of an output shaft of the internal combustion engine as necessary to disable rotation of the output shaft;
   a request drive force setter configured to set up a request drive force depending on a driver's request;
   a stored energy level detector configured to detect a stored energy level of a battery; and
   a controller configured for a control to be executed in accordance with a condition based on a state of charge (SOC) of the battery to stop the internal combustion engine, use the output shaft fixing mechanism to stop the output shaft, and run the vehicle in an electric only mode using the motor generator regardless of the requested drive force.

2. The drive control apparatus for hybrid vehicles according to claim 1, wherein said condition comprises the stored energy level being a preset value or more.

3. The drive control apparatus for hybrid vehicles according to claim 1, wherein said condition comprises a combination of an upper limit of charge power to the battery and an upper limit of discharge power from the battery set up on a basis of the stored energy level, the upper limit of charge power to the battery being a preset value or less, the upper limit of discharge power from the battery being a preset value or less.

4. The drive control apparatus for hybrid vehicles according to claim 3, wherein the controller is adapted in a situation free from the control being executed in accordance with said condition to stop the internal combustion engine,
   for a control to drive the internal combustion engine and the motor generator, when the requested drive force is a prescribed value or more, and
   for a control to stop the internal combustion engine, use the output shaft fixing mechanism to fix the output shaft, and run the vehicle in an electric only mode using the motor generator when the requested drive force is smaller than the prescribed value.

5. The drive control apparatus for hybrid vehicles according to claim 1, wherein
   the motor generator comprises a pair of a first motor generator and a second motor generator, and
   the power transmission mechanism comprises a planetary gear set having four elements including the internal combustion engine, the first motor generator, the second motor generator, and an output section connected on a collinear diagram in an order of the first motor generator, the internal combustion engine, the output section, and the second motor generator.

6. The drive control apparatus for hybrid vehicles according to claim 1, wherein the output shaft fixing mechanism comprises a one-way clutch connected to the output shaft of the internal combustion engine, to permit rotation thereof in one direction and disable rotation thereof in the reverse direction.

7. The drive control apparatus for hybrid vehicles according to claim 5, wherein the output shaft fixing mechanism is operable to fix a member directly connected to the output shaft of the internal combustion engine, to disable rotation thereof.

8. A drive control method for hybrid vehicles adapted to output generated power at an internal combustion engine and a motor generator through a power transmission mechanism to drive axles, the drive control method for hybrid vehicles comprising:

executing a control in accordance with a condition based on a state of charge (SOC) of a battery to stop the internal combustion engine, fix an output shaft of the internal combustion engine to disable rotation thereof, and run the vehicle in an electric only mode using the motor generator regardless of the requested drive force.

9. The drive control method for hybrid vehicles according to claim 8, wherein said condition comprises the stored energy level of the battery being a preset value or more.

10. The drive control method for hybrid vehicles according to claim 8, wherein said condition comprises a combination of an upper limit of charge power to the battery and an upper limit of discharge power from the battery set up on a basis of the stored energy level of the battery, the upper limit of charge power to the battery being a preset value or less, the upper limit of discharge power from the battery being a preset value or more.

11. The drive control method for hybrid vehicles according to claim 8, comprising implementing an adaptation in a situation free from the control being executed in accordance with said condition to stop the internal combustion engine,
for a control to drive the internal combustion engine and the motor generator, when the requested drive force is a prescribed value or more, and
for a control to stop the internal combustion engine, fix the output shaft to disable rotation thereof, and run the vehicle in an electric only mode using the motor generator when the requested drive force is smaller than the prescribed value.

12. A hybrid vehicle comprising a drive control apparatus according to claim 1.

* * * * *